(12) United States Patent
Mitani

(10) Patent No.: US 8,827,471 B2
(45) Date of Patent: Sep. 9, 2014

(54) STORAGE STRUCTURE AND SUPPORT MECHANISM FOR LIGHT EMITTING DEVICE

(71) Applicant: Pentax Ricoh Imaging Company, Ltd., Tokyo (JP)

(72) Inventor: Shohei Mitani, Tokyo (JP)

(73) Assignee: Pentax Ricoh Imaging Company, Ltd., Tokyo (JP)

(*) Notice: Subject to any disclaimer, the term of this patent is extended or adjusted under 35 U.S.C. 154(b) by 13 days.

(21) Appl. No.: 13/738,252

(22) Filed: Jan. 10, 2013

(65) Prior Publication Data

US 2013/0182404 A1    Jul. 18, 2013

(30) Foreign Application Priority Data

Jan. 18, 2012  (JP) .................................. 2012-008455
Jan. 18, 2012  (JP) .................................. 2012-008474

(51) Int. Cl.
*G03B 15/02*    (2006.01)
*G03B 15/03*    (2006.01)
*G03B 15/05*    (2006.01)

(52) U.S. Cl.
CPC ........ *G03B 15/03* (2013.01); *G03B 2215/0507* (2013.01); *G03B 15/05* (2013.01)
USPC ............... 362/3; 362/253; 362/287; 362/269; 396/177; 396/178

(58) Field of Classification Search
CPC . G03B 2215/0507; G03B 15/03; G03B 15/05
USPC .............................................. 362/3, 285
See application file for complete search history.

(56) References Cited

U.S. PATENT DOCUMENTS

| | | | | |
|---|---|---|---|---|
| 5,021,814 A | * | 6/1991 | Sato ............................. | 396/113 |
| 5,134,433 A | * | 7/1992 | Takami et al. ................ | 396/165 |
| 5,142,465 A | | 8/1992 | Sato | |
| 5,233,378 A | * | 8/1993 | Hosokawa et al. ........... | 396/177 |
| 5,245,374 A | * | 9/1993 | Hosokawa et al. ........... | 396/177 |
| RE35,415 E | * | 12/1996 | Takami ......................... | 396/165 |
| 6,909,847 B2 | * | 6/2005 | Ujikane et al. ................ | 396/178 |
| 2012/0294601 A1 | * | 11/2012 | Akiyama ...................... | 396/177 |

FOREIGN PATENT DOCUMENTS

| | | |
|---|---|---|
| JP | 08-054669 A | 2/1996 |
| JP | 2004-151684 A | 5/2004 |
| JP | 2010-191017 A | 9/2010 |

* cited by examiner

*Primary Examiner* — Ali Alavi
(74) *Attorney, Agent, or Firm* — Greenblum & Bernstein, P.L.C.

(57) ABSTRACT

A storage structure for a light-emitting device is included in a camera body, which also includes a lens mount formed on its front side for attaching a lens barrel and an imaging element arranged on its back side with a center thereof aligned with the center of the lens mount. The storage structure is a concave storage compartment arranged to correspond with an upper part of the lens mount. The light-emitting device is attached to the storage compartment and capable of popping up and down therefrom, the floor of the concave storage compartment is located between a lower edge of an engaging pawl, which is arranged at an upper edge portion of the lens mount, and the upper side of the imaging area of the imaging element.

17 Claims, 10 Drawing Sheets

STORAGE STRUCTURE AND SUPPORT MECHANISM FOR LIGHT EMITTING DEVICE

BACKGROUND OF THE INVENTION

1. Field of the Invention

The present invention relates to a light-emitting device which is arranged on a camera body of an interchangeable lens camera, for example, and more specifically relates to a structure to store a light-emitting device in a camera body.

2. Description of the Related Art

Conventionally, a light-emitting device of an interchangeable lens camera is structured to be stored in a camera body when not in use and to be popped up before use. It is preferable that the pop-up height of the light-emitting device is set as high as possible to prevent occurrence of a so-called eclipse caused by a photographing lens that projects frontward from the camera body and interrupts the illumination light from the light-emitting device. Examples of known pop-up light-emitting devices which are connected to a camera body are disclosed in Japanese Unexamined Patent Publication No. 2010-191017 and Japanese Unexamined Patent Publication No. 2004-151684.

A camera with a light-emitting device disclosed in Japanese Unexamined Patent Publication No. 2010-191017 is a compact camera not being an interchangeable lens type. Therefore, the light-emitting device can be compactly stored with less restriction in the camera body. In contrast, in a light-emitting device disclosed in Japanese Unexamined Patent Publication No. 2004-151684, a support mechanism for a pop-up device is large. Therefore, there is a problem because the storage compartment for the light-emitting device projects significantly from an upper face of the camera body.

SUMMARY OF THE INVENTION

An object of the present invention is to provide a storage structure for a light-emitting device in an interchangeable lens camera so that the light-emitting device can be stored compactly in a camera body even with a support mechanism which provides a sufficiently large pop-up height for the light-emitting device.

According to the present invention, a first storage structure for a light-emitting device is provided with a camera body, which includes a lens mount formed on its front side for attaching a lens barrel, an imaging element arranged on a back side with a center thereof aligned with the center of the lens mount, and a concave storage compartment which is in a position corresponding to an upper part of the lens mount and to which the light-emitting device is attached and capable of popping up and down therefrom. Here, a lower surface or floor of the concave storage compartment is located between a lower edge of an engaging pawl, which is arranged at an upper edge portion of the lens mount, and the upper side of the imaging area of the imaging element.

Further, a second storage structure for a light-emitting device according to the present invention is provided with a camera body that includes a lens mount formed on its front side for attaching a lens barrel, an imaging element arranged on its back side with a center thereof aligned with the center of the lens mount, and a concave storage compartment, which is in a position corresponding to an upper part of the lens mount and to which the light-emitting device is attached and capable of popping up and down therefrom. Here, the vertical distance from the upper end of the lens mount to the floor of the concave storage compartment is greater than the distance from the upper end to an upper face of the light-emitting device.

Further, a support mechanism for the light-emitting device according to the present invention includes a first arm which is axially supported by the camera body with a first support component, a connecting member which is rotatably connected to an end of the first arm with a second support component being different from the first support component, and a light-emitting unit which includes a light-emitting portion that is rotatably connected to the connecting member with a third support component being different from the second support component. Here, the first arm and the light-emitting unit are parallel to each other and the light-emitting portion is adjacent to the first support component in a storage state in which the first arm, the connecting member and the light-emitting unit are stored in the concave storage compartment of the camera body.

BRIEF DESCRIPTION OF THE DRAWINGS

The object and advantages of the present invention will be better understood from the following description, with reference to the accompanying drawings in which.

DESCRIPTION OF THE PREFERRED EMBODIMENTS

Figure 1:
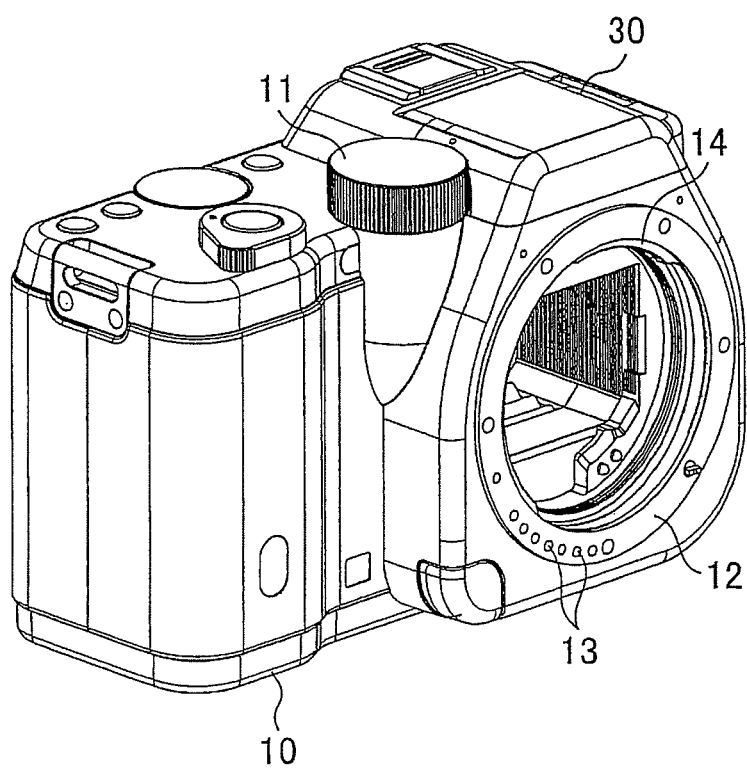
FIG. 1 is a perspective view of a camera body of an interchangeable lens camera to which an embodiment of the present invention is applied.

FIG. 1 illustrates an external appearance of an interchangeable lens camera in a state that a lens barrel is detached from a camera body 10. The camera being a so-called mirrorless-type is not provided with an optical finder. An object image is displayed on a monitor which is arranged on the back side of the camera body 10. A mode dial 11 for selecting a photographing mode and the like is arranged on an upper face of the camera body 10 and a light-emitting device 30 is arranged beside the mode dial 11. Further, a light emission button 39

(see FIG. 3), which causes the light-emitting device 30 to pop up, is arranged on the upper face of the camera body 10. Here, in FIG. 1, the light-emitting device 30 is in a stored state in the camera body 10.

A lens mount 12 to which a lens barrel is attached is formed on the front side of the camera body 10. The lens mount 12 is circular and is located directly below the light-emitting device 30 from a front view perspective of the camera body 10. The lens mount 12 is provided with contact points 13 for data communication and the like between a control system in the camera body 10 and a control system in the lens barrel, a pawl 14 for attaching the lens barrel, and the like.

Figure 2:
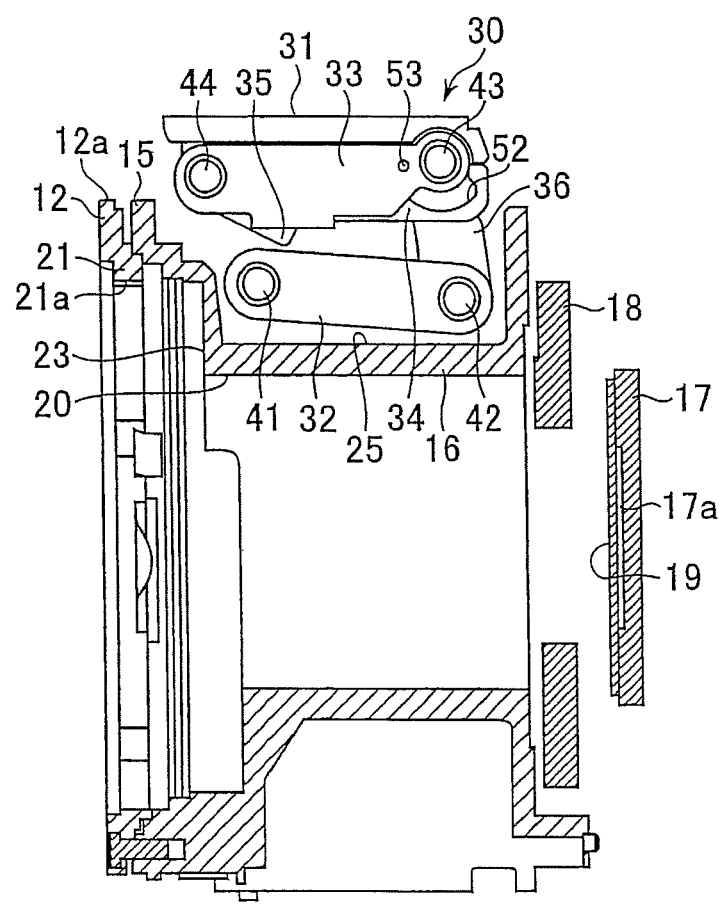
FIG. 2 is a cross-sectional view of an extracted part of a structure in a camera body illustrating a state in which a light-emitting device is stored in a concave storage compartment.
Figure 3:
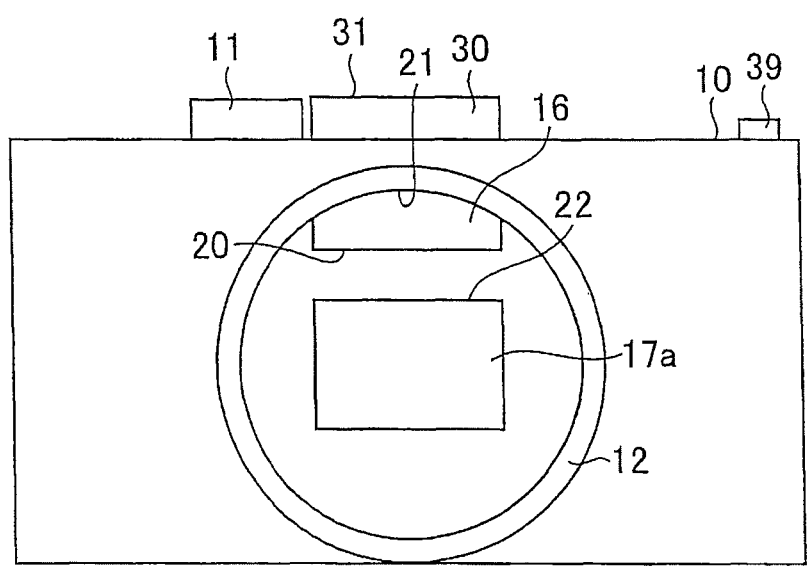
FIG. 3 is a front view schematically illustrating the camera body in a storage state where the light-emitting device is stored in the concave storage compartment.

FIG. 2 is an exploded view of part of a structure in the camera body 10. The lens mount 12 is fixed to a front face of a camera obscura 15. A concave storage compartment 16 to which the light-emitting device 30 is attached and capable of popping up and down from is formed in a position above an upper part of the camera obscura 15 and corresponds to an upper part of the lens mount 12. An imaging element 17 is arranged on the back side of the camera body 10 and a shutter 18 is arranged between the imaging element 17 and the camera obscura 15. An imaging area 17a arranged on the front-facing side of the imaging element 17 is covered with a cover glass 19. As illustrated in FIG. 3, the imaging area 17a is rectangular from a front view perspective of the camera body 10. The imaging element 17 is arranged so that the center of a light-receiving face thereof is in line with the center of the lens mount 12. Further, the width of the concave storage compartment 16 is less than the width of the lens mount 12.

In the present embodiment, the concave storage compartment 16 is positioned at an upper part of the lens mount 12 and designed to sit as low as possible to reduce the distance an upper face 31 of the light-emitting device 30 resides above the upper surface of the camera body 10. That is, a vertical distance from the upper end 12a of the lens mount 12 to the floor 25 of the concave storage compartment 16 is greater than a vertical distance from the upper end 12a to the upper face 31 of the light-emitting device 30. As illustrated in FIG. 2, the floor 25 of the concave storage compartment 16 is located between a lower edge 21a of an engaging pawl, which is arranged at an upper edge portion 21 of the lens mount 12, and an upper side 22 of the imaging area 17a. Further, the front side 23 of the concave storage compartment 16 is located behind the lens mount 12 in the camera body 10. That is, the concave storage compartment 16 and the entire light-emitting device 30 in a stored state are located behind the lens mount 12.

In this manner, the concave storage compartment 16 is arranged in the lowest possible position without causing its outer wall 20 to interfere with incident light from a photographing lens. Accordingly, the upper face 31 of the light-emitting device 30 is approximately at the same height as any member (the mode dial 11 in the present embodiment) arranged on the upper face of the camera body 10 other than the light-emitting device 30, so as not to project above another member. Further, the lowest possible position for lower outer wall 20 of the concave storage compartment 16 can be defined with respect to the design of the photographing lens. Here, the floor 25 of the concave storage compartment 16 may be simply located so that the lower outer wall 20 is adjacent to the upper side 22 of the imaging area 17a.

As can be seen from FIG. 2, the height of the light-emitting device 30 in a stored state, that is, the vertical distance from the floor 25 to the upper face 31 is less than the height of the camera obscura 15. The light-emitting device 30 is compactly folded when stored in the concave storage compartment 16.

On the other hand, in a case of a photographing apparatus such as a compact camera, which does not have a lens mount 12, the concave storage compartment 16 is arranged in the camera body 10 such that the floor 25 of the concave storage compartment 16 is positioned between the upper side 22 of the imaging area 17a and a top surface of the camera body 10. The top surface is a surface of the camera body 10, to which a release button and so on is provided. A light-emitting portion of the light-emitting device 30, from which light is radiated, is positioned on the upper side of the camera body such that, although not necessarily centered directly above the photographing lens, a part of the breadth of the light-emitting portion is directly above the optical axis of the photographing lens.

When the light-emitting device 30 is stored in the concave storage compartment 16, an upper surface of the light-emitting device 30 is positioned above a top surface of the camera body 10. Due to this, in comparison with a structure in which an upper surface of the light-emitting device is flush with a top surface of the camera body, the popped-up light-emitting portion is positioned higher, and thus light emitted from the light-emitting portion is prevented from vignetting, which would be caused by interference with the photographing lens mounted on a front face of the camera body.

Figure 4:
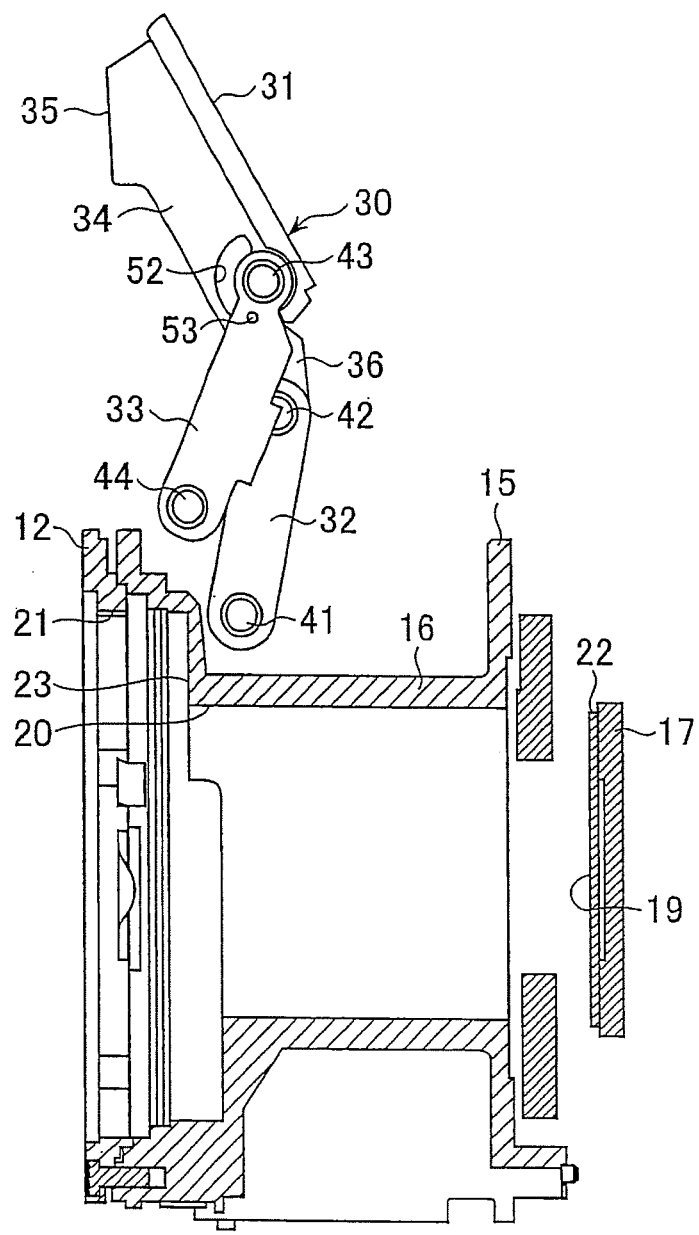
FIG. 4 is a cross-sectional view of the same section as FIG. 2 with the light-emitting device in a pop-up state.

FIG. 4 illustrates a state in which the light-emitting device 30 pops up. The light-emitting device 30 is supported by a first arm 32 and a second arm 33, and is rotatable against the camera body 10. A light-emitting unit 34 pops up when the arms 32, 33 are raised from a stored state in FIG. 2. In the pop-up state, the first arm 32 is approximately perpendicular to the floor of the concave storage compartment 16 and the second arm 33 is inclined to the imaging element side from the first arm 32. A front face of a light-emitting portion 35 of the light-emitting unit 34 is approximately parallel to the front face of the lens mount 12.

Returning to FIG. 2, in a stored state, that is, in a state that the first and second arms 32, 33, a connecting member 36 and the light-emitting unit 34 are stored in the concave storage compartment 16, the first and second arms 32, 33 and the light-emitting unit 34 are mutually parallel. The light-emitting portion 35 is adjacent to a later-mentioned pin 41. Further, the connecting member 36, which connects the first arm 32 with the light-emitting unit 34, is approximately perpendicular to the arms 32, 33 and the light-emitting unit 34. That is, the light-emitting device 30 rests in the stored state in a lateral U-shaped formation as views from a side view perspective of the camera body 10.

Figure 5:
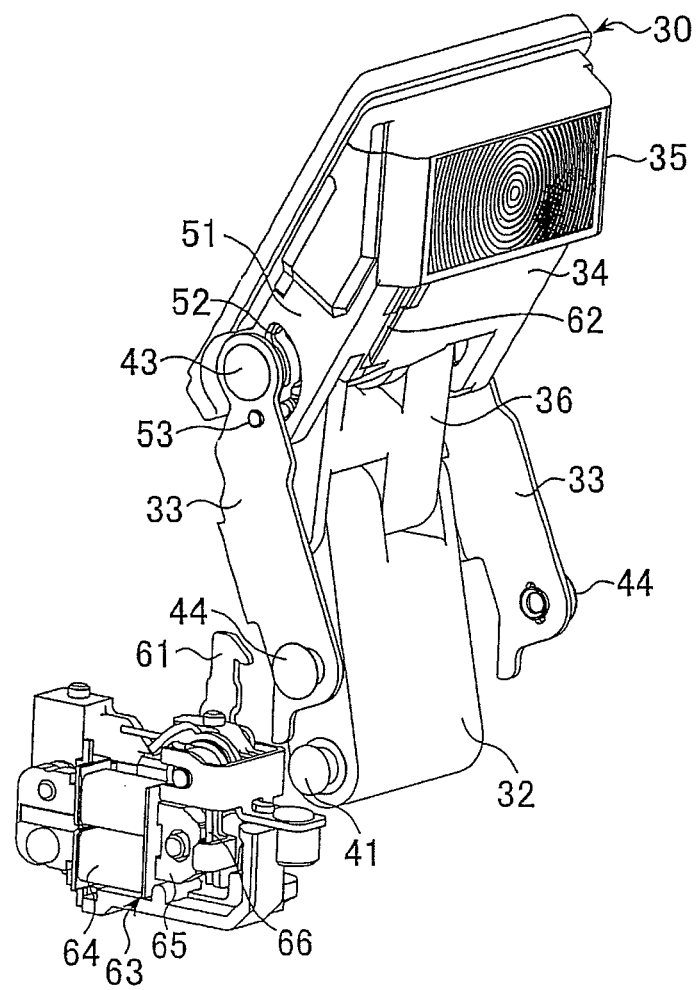
FIG. 5 is a perspective view illustrating a support mechanism of the light-emitting device.
Figure 6:
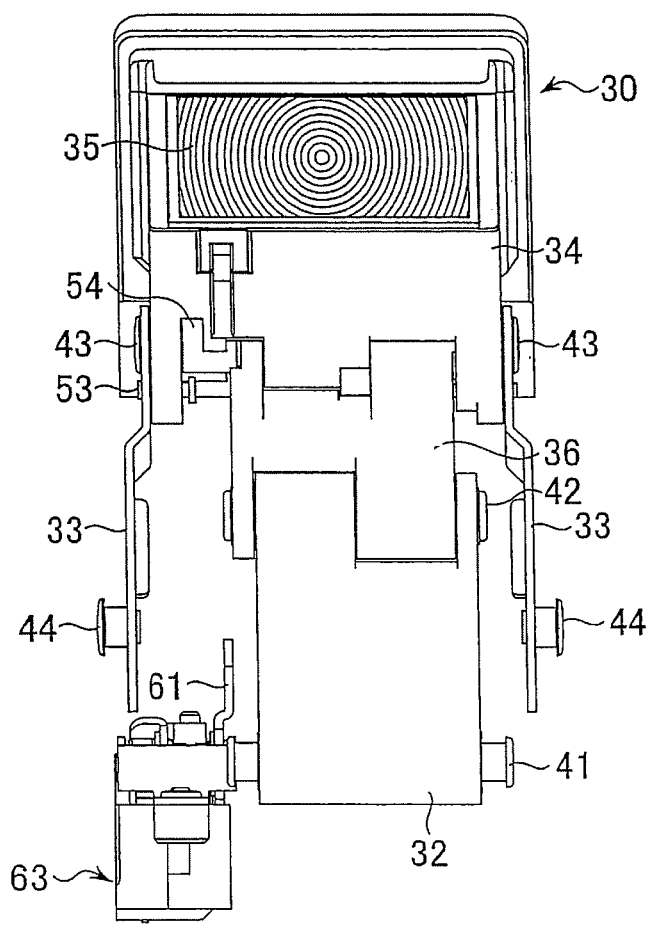
FIG. 6 is a front view illustrating the support mechanism of the light-emitting device.
Figure 7:
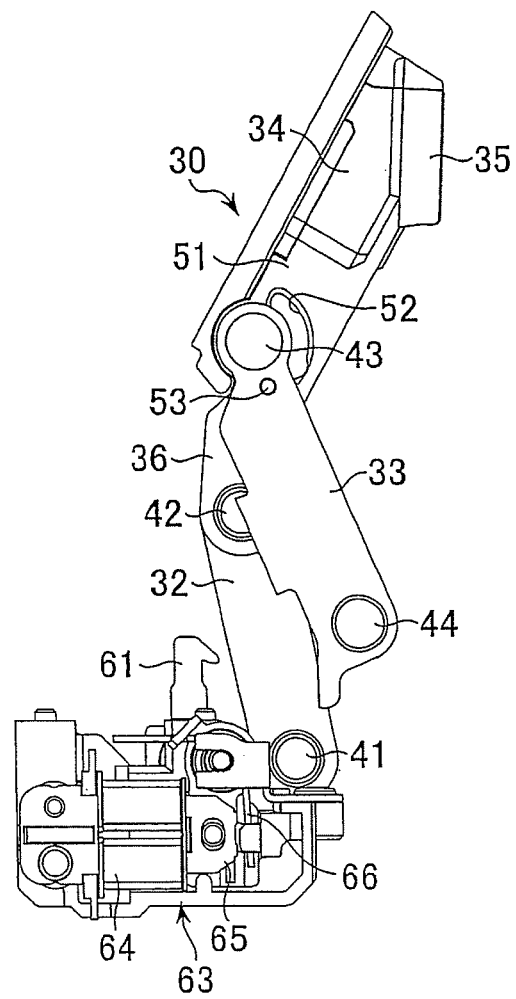
FIG. 7 is a side view illustrating the support mechanism of the light-emitting device.

Next, a structure of a support mechanism of the light emitting device 30 with respect to the camera body 10 is described with references to FIGS. 5 to 7. The first arm 32 is axially supported by the camera body 10 with the pin 41 being a first support component. The connecting member 36 is rotatably connected to an end of the first arm 32 with a pin 42 being a second support component. The light-emitting unit 34 is rotatably connected to the connecting member 36 with a pin 43 being a third support component, which is located at an opposite end of the connecting member from the pin 42. The second arm 33 is axially supported by the camera body 10 by a pin 44 being a fourth support component, which is different from the pin 41 being the first support component. One end of the second arm 33 is connected to the pin 43 being the third support component 43. In this manner, a linkage mechanism is structured with the first and second arms 32, 33, the connecting member 36, and the pins 41 to 44.

An arc-shaped slit 52 is formed in a side wall 51 of the light-emitting unit 34. An engaging pin 53 is fixed to the second arm 33 at a position being close to the pin 43 and the engaging pin 53 is engaged with the arc-shaped slit 52. The light-emitting unit 34 is rotatable against the second arm 33 in a range where the engaging pin 53 is engaged with the arc-shaped slit 52. That is, the engaging pin 53 is engaged to one end of the arc-shaped slit 52 in the stored state of FIG. 2 and is engaged to the other end of the arc-shaped slit 52 in the pop-up state of FIG. 4.

A pop-up spring 54 being a coil spring is arranged at the pin 43. One end of the spring 54 is engaged with the light-emitting unit 34 and the other end thereof is engaged with the engaging pin 53, that is, the second arm 33 (see FIGS. 8 and 10). The light-emitting unit 34 and the second arm 33 are continuously urged by the spring 54 in a direction forming an angle therebetween close to 180°. For example, in the stored state as illustrated in FIG. 2, the angle formed by the light emitting unit 34 and the second arm 33 is about 0°. Here, the light emitting unit 34 is urged in a rotating direction about the pin 43 to move apart from the second arm 33. Further, in the pop-up state as illustrated in FIG. 4, the light-emitting unit 34 is urged in a direction that enlarges the angle between it and the second arm 33. However, since the engaging pin 53 is engaged at the end part of the arc-shaped slit 52, the angle between the light-emitting unit 34 and the second arm 33 does not become larger than the 180° angle indicated above.

An engaging pawl 61 is arranged at an upper face of the camera body 10 beside the concave storage compartment 16. The engaging pawl 61 is movable in a front-back direction of the camera body 10, that is, along a plane parallel to the rotating faces of the first and second arms 32, 33. Further, the engaging pawl 61 can be engaged with the light-emitting unit 34 in a storage state in which the first and second arms 32, 33, the connecting member 36 and the light-emitting unit 34 are stored in the concave storage compartment 16 (stored state illustrated in FIG. 2). A groove 62 to enable engagement with the engaging pawl 61 is formed at a lower face of the light emitting unit 34.

An engaging pawl driving portion 63 for moving the engaging pawl 61 is arranged in the camera body 10. The engaging pawl driving portion 63 includes an electromagnet 64, a movable member 65, and an engagement spring 66. The engaging pawl 61 is rotatable about a fulcrum (not illustrated). The movable member 65 is connected to a swing portion at an opposite side to the engaging pawl 61, thus sandwiching the fulcrum. The engaging pawl 61 is urged to the front side of the camera body 10 (rightward in FIG. 7) by the engaging spring 66. When the electromagnet 64 is powered, the movable member 65 projects rightward in FIG. 7 and the engaging pawl 61 retracts leftward in FIG. 7 with an urging force provided by the engaging spring 66 in union with the projecting movement. That is, the engaging pawl 61 is engaged with the groove 62 in the stored state illustrated in FIG. 2 and the light-emitting unit 34 is maintained in the stored state. Here, when a light-emitting button 39 is depressed and the electromagnet 64 is powered, the engaging pawl 61 retracts and releases the groove 62 so that the light-emitting unit 34 can pop.

As can be seen from FIG. 6, from a front-view perspective of the camera body 10, the first arm 32, the connecting member 36 and the engaging pawl driving portion are structured to fit within the width of the light-emitting unit 34. Lead wires for electrically connecting the light-emitting unit 34 and an electronic circuit (not illustrated) are stored respectively in the first arm 32 and the connecting member 36. Here, the lengths of the first arm 32 and the connecting member 36 in a direction along the axial direction of the pin 41 are shorter than the width of the light-emitting portion 35. The engaging pawl driving portion 63 and the engaging pawl 61 are arranged in a space formed between the first arm 32 and the second arm 33.

Next, a structure and operation of a pop-up mechanism adopted in the present embodiment will be described with reference to FIGS. 8 to 12.

As describe above, the pop-up spring 54 is arranged at the pin 43, which is the third support component that extends penetrating through the connecting member 36. A stopper 71 formed by swelling a part of a disc outward in a radial direction is provided at the connecting member 36. The stopper 71 is capable of abutting against an abutment face 72, which is formed at the light-emitting unit 34. Meanwhile, the second arm 33 includes a projection 73 which extends in a direction opposite to the pin 43, which is the third support component, in the vicinity of the pin 44. The projection 73 is capable of engaging with a stopper pin 74, which is fixed to the camera body 10.

Figure 8:
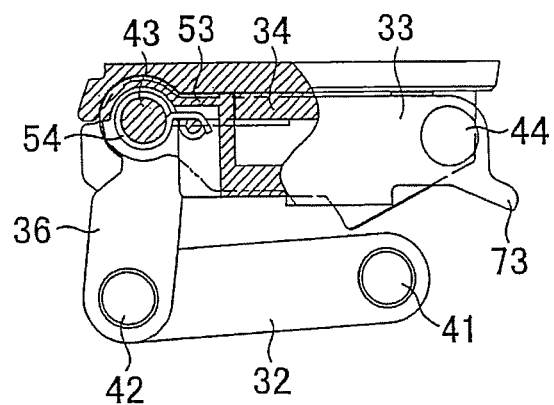
FIG. 8 is a side view illustrating the light-emitting device in a storage state at a section where a pop-up spring is arranged.
Figure 9:
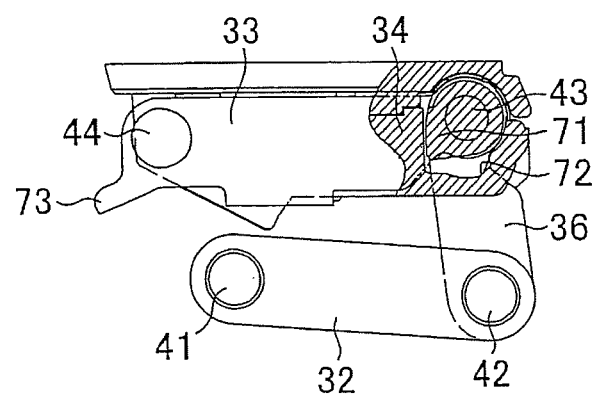
FIG. 9 is a side view illustrating the light-emitting device in a storage state at a section where a stopper is arranged.
Figure 10:
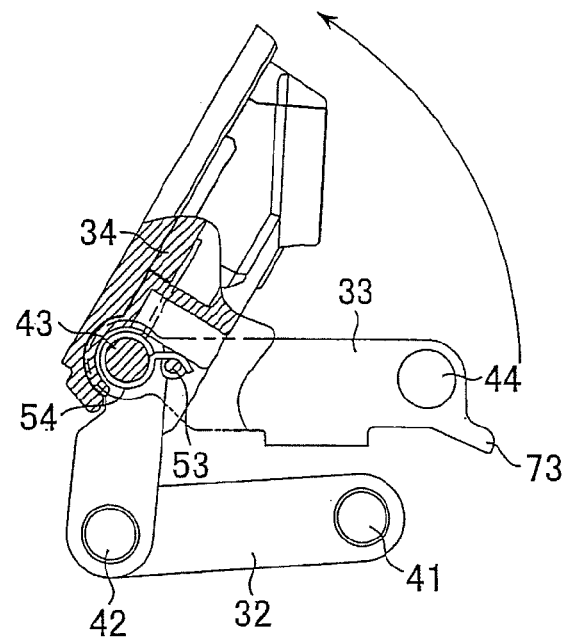
FIG. 10 is a side view illustrating the light-emitting device in the process of popping up at a section where the pop-up spring is arranged.
Figure 11:
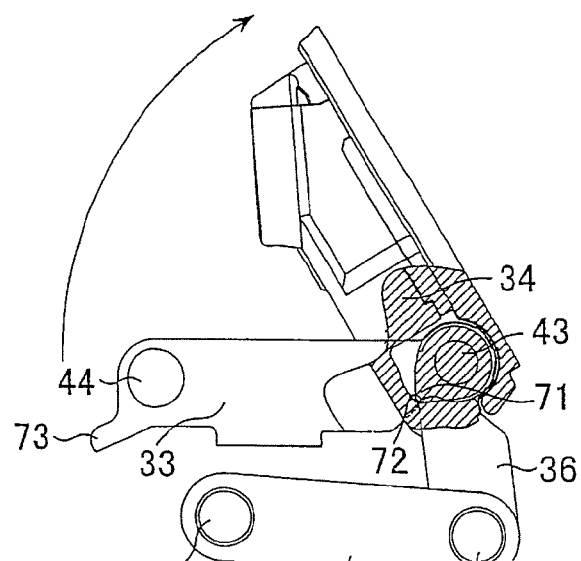
FIG. 11 is a side view illustrating the light-emitting device in the process of popping up at a section where the stopper is arranged.
Figure 12:
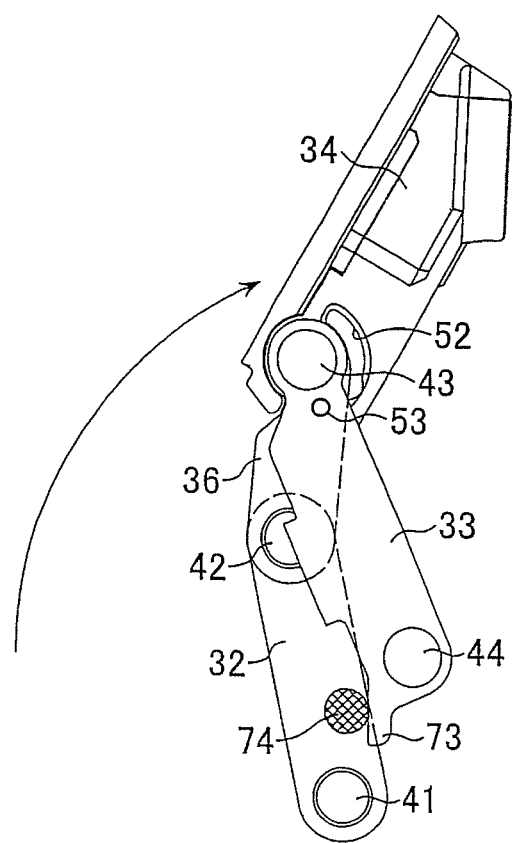
FIG. 12 is a side view illustrating the light-emitting device in the popped-up or extended state.

In a stored state of the light-emitting device 30, the angle formed by the light-emitting unit 34 and the second arm 33 is about 0° as illustrated in FIGS. 8 and 9. The light-emitting unit 34 is approximately perpendicular to the connecting member 36 and the stopper 71 is apart from the abutment face 72. When the engaging pawl 61 retracts and releases the light-emitting unit 34 from the above state, the light-emitting unit 34 rotates against the connecting member 36 with an urging force provided by the spring 54 and rises against the connecting member 36 as illustrated in FIGS. 10 and 11. When the stopper 71 abuts against the abutment face of the light-emitting unit 34, the rotation of the light-emitting unit 34 against the connecting member 36 is stopped, and the light-emitting unit 34 and the second arm 33 are moved so that the angle therebetween increases with the urging force of the spring 54. That is, as illustrated in FIG. 12, the second arm 33 rises with rotation about the pin 44 and stops at a position where the projection 73 engages with the stopper pin 74.

As described above, according to the support mechanism of the light-emitting device 30 of the present embodiment, since the light-emitting unit 34 is connected to the first arm 32 via the connecting member 36, the light-emitting unit 34 pops up to a sufficient height. Therefore, the occurrence of an eclipse can be prevented even if an attached photographing lens projects substantially forward from the front face of the camera body 10.

Further, when the light-emitting unit 34 is in the stored state, the light-emitting device 30 can be compactly stored in the concave storage compartment 16 by compactly folding into a lateral U-shaped formation. Further, the floor 25 of the concave storage compartment 16 is located between the upper edge portion 21 of the lens mount 12 and the upper side 22 of the right receiving area of the imaging element 17, while the front side 23 of the concave storage compartment 16 is located behind the lens mount 12 of the camera body 10. Accordingly, the concave storage compartment 16 can be positioned as low as possible to minimize the height of the upper face 31 of the light-emitting device 30 above the upper face of the camera body 10.

Thus, since the mirrorless-type camera does not have a mirror or a prism, the light-emitting unit 34 can be compactly stored in the concave storage compartment 16, which is in contrast to a common single-lens reflex camera. However, the light-emitting unit 34 in the mirrorless-type camera can also pop up to a sufficient height, which is similar to a single-lens reflex camera.

In the above embodiment, the pop-up spring 54 is arranged only at the pin 43. Alternatively, it is also possible that springs are arranged at the pins 41, 42 as well as between the light-emitting unit 34 and the connecting member 36. With this structure, the second arm 33 may be eliminated.

Here, instead of the arrangement of the electromagnet 64, the light-emitting device 30 may have a structure in which the engaging pawl 61 is mechanically disengaged when the light-emitting button 39 is depressed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2012-008455 (filed on Jan. 18, 2012) and Japanese Patent Application No. 2012-008474 (filed on Jan. 18, 2012) which are expressly incorporated herein, by reference, in its entirety.

The invention claimed is:

1. A storage structure for a light-emitting device, comprising:
a camera body which includes a lens mount formed at a front side for attaching a lens barrel and an imaging element arranged at a back side with a center thereof aligned with the center of the lens mount; and
a concave storage compartment which is formed at a position corresponding to an upper part of the lens mount and to which the light-emitting device is attached and capable of popping up and down therefrom,
the concave storage compartment having a floor located between a lower edge of an engaging pawl, which is arranged at an upper edge portion of the lens mount, and the upper side of the imaging area of the imaging element.

2. The storage structure for a light-emitting device according to claim 1, wherein the concave storage compartment and the entire light-emitting device, while stored in the concave storage compartment, are arranged at the back side of the camera body from the lens mount.

3. The storage structure for a light-emitting device according to claim 1, wherein an upper surface of the light-emitting device, while stored in the concave storage compartment, is approximately at the same height as any member arranged on the upper side of the camera body, other than the light-emitting device.

4. The storage structure for a light-emitting device according to claim 1, wherein the width of the concave storage compartment is less than the width of the lens mount from a front view perspective of the camera body.

5. The storage structure for a light-emitting device according to claim 1, wherein the height of the light-emitting device while stored in the concave storage compartment is less than the height of a camera obscura, which is arranged in the camera body.

6. The storage structure for a light-emitting device according to claim 1, wherein a vertical distance from an upper end of the lens mount to the floor of the concave storage compartment is greater than a vertical distance from the upper end to the upper surface of the light-emitting device.

7. The storage structure for a light-emitting device according to claim 1, wherein the floor of the concave storage compartment is located as low as possible so that a lower outer wall of the concave storage compartment is as close to the imaging area of the imaging element as possible.

8. The storage structure for a light-emitting device according to claim 1, further comprising a support mechanism with which the light-emitting device is attached to the camera body, the support mechanism including:
a first arm which is axially supported by the camera body with a first support component;
a connecting member which is rotatably connected to an end of the first arm with a second support component being different from the first support component; and
a light-emitting unit which includes a light-emitting portion as being rotatably connected to the connecting member with a third support component being different from the second support component,
the first arm and the light-emitting unit being in parallel to each other and the light-emitting portion is adjacent to the first support component in a storage state where the first arm, the connecting member and the light-emitting unit are stored in the concave storage compartment of the camera body.

9. A storage structure for a light-emitting device, comprising:
a camera body which includes a lens mount formed on a front side for attaching a lens barrel and an imaging element arranged on a back side with a center thereof aligned with the center of the lens mount; and
a concave storage compartment which is configured in a position corresponding to an upper part of the lens mount and to which the light-emitting device is attached and capable of popping up and down therefrom,
a vertical distance from an upper end of the lens mount to the floor of the concave storage compartment being greater than a vertical distance from the upper end to an upper face of the light-emitting device.

10. A storage structure for a photographing apparatus, comprising:
a camera body, in which an imaging element is provided and a concave storage compartment is formed; and
a light-emitting device housed in the concave storage compartment, to pop up and down, the light-emitting device having a light-emitting portion from which light is radiated, the light-emitting portion being positioned on the upper side of the camera body such that a part of the breadth of the light-emitting portion is directly above the optical axis of the photographing lens, an upper surface of the light-emitting device being positioned above a top surface of the camera body when the light-emitting device is stored in the concave storage compartment;
the concave storage compartment being arranged such that a floor of the concave storage compartment is positioned between an upper side of the imaging area of the imaging element and the top surface of the camera body.

11. A support mechanism for a light-emitting device, comprising:
a first arm which is axially supported by the camera body with a first support component;
a connecting member which is rotatably connected to an end of the first arm with a second support component being different from the first support component; and
a light-emitting unit, which includes a light-emitting portion, rotatably connected to the connecting member with a third support component being different from the second support component,
the first arm and the light-emitting unit being parallel to each other and the light-emitting portion being adjacent to the first support component in a storage state where the first arm, the connecting member and the light-emitting unit are stored in the concave storage compartment of the camera body.

12. The support mechanism for a light-emitting device according to claim 11, further comprising a second arm which is axially supported by the camera body with a fourth support component being different from the first support component,
an end part of the second arm being connected to the third support component.

13. The support mechanism for a light-emitting device according to claim 12, further comprising a spring which is provided at the third support component,
one end part of the spring being engaged with the light-emitting unit and the other end part of the spring being engaged with the second arm so that the light-emitting unit and the second arm are urged in a direction producing an angle therebetween close to 180°.

14. The support mechanism for a light-emitting device according to claim 12, wherein the second arm and the light-emitting unit are parallel to each other in a storage state where the first and second arms, the connecting member and the light-emitting unit are stored in the concave storage compartment of the camera body.

15. The support mechanism for a light-emitting device according to claim 11, further comprising:
an engaging pawl which is movably arranged on the camera body and engageable with the light-emitting unit in a storage state where the first arm, the connecting member and the light-emitting unit are stored in the concave storage compartment; and
an engaging pawl driving apparatus which is arranged in the camera body to move the engaging pawl,
the first arm, the connecting member, the engaging pawl and the engaging pawl driving apparatus being fit within the width of the light-emitting unit when viewed from the front side of the camera body.

16. The support mechanism for a light-emitting device according to claim 11, wherein a circular lens mount for attaching a lens barrel is formed on the front side of the camera body, a rectangular imaging element is arranged on the back side of the camera body with a center thereof aligned with the center of the lens mount, and the floor of the concave storage compartment is located between a lower edge of an engaging pawl, which is arranged at the upper edge portion of the lens mount, and the upper side of the imaging area of the imaging element.

17. A support mechanism for a light-emitting device, comprising:
a first arm which is axially supported by the camera body with a first support component;
a connecting member which is rotatably connected to an end of the first arm with a second support component being different from the first support component; and
a light-emitting unit, which includes a light-emitting portion, rotatably connected to the connecting member with a third support component being different from the second support component,
the first arm, the connecting member and the light-emitting unit being configured in the form of a laterally facing U-shape as viewed from a lateral perspective of the camera body in a storage state where the first arm, the connecting member and the light-emitting unit are stored in the concave storage compartment of the camera body.

* * * * *